D. F. PREVOST.
TREE HANDLING APPARATUS.
APPLICATION FILED MAR. 19, 1913; RENEWED OCT. 6, 1914.
1,138,972.
Patented May 11, 1915.
3 SHEETS—SHEET 2.
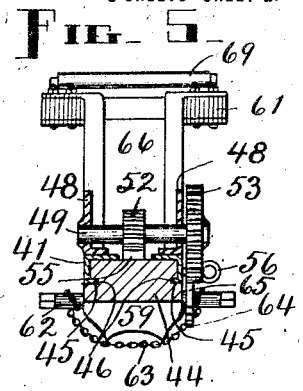
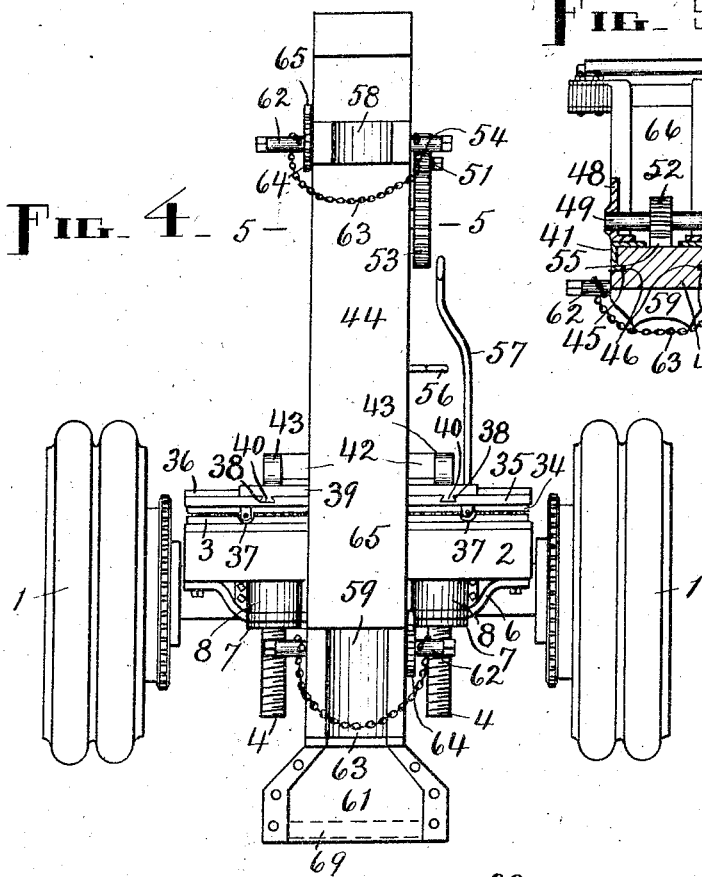
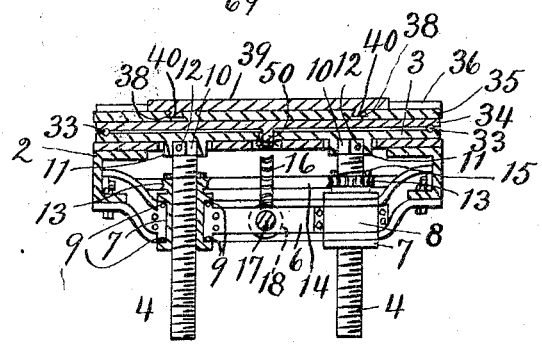
WITNESSES:
A. C. Fairbanks.
H. S. Cutter.
INVENTOR.
Dwight F. Prevost,
BY
Webster & Co.,
ATTORNEYS.

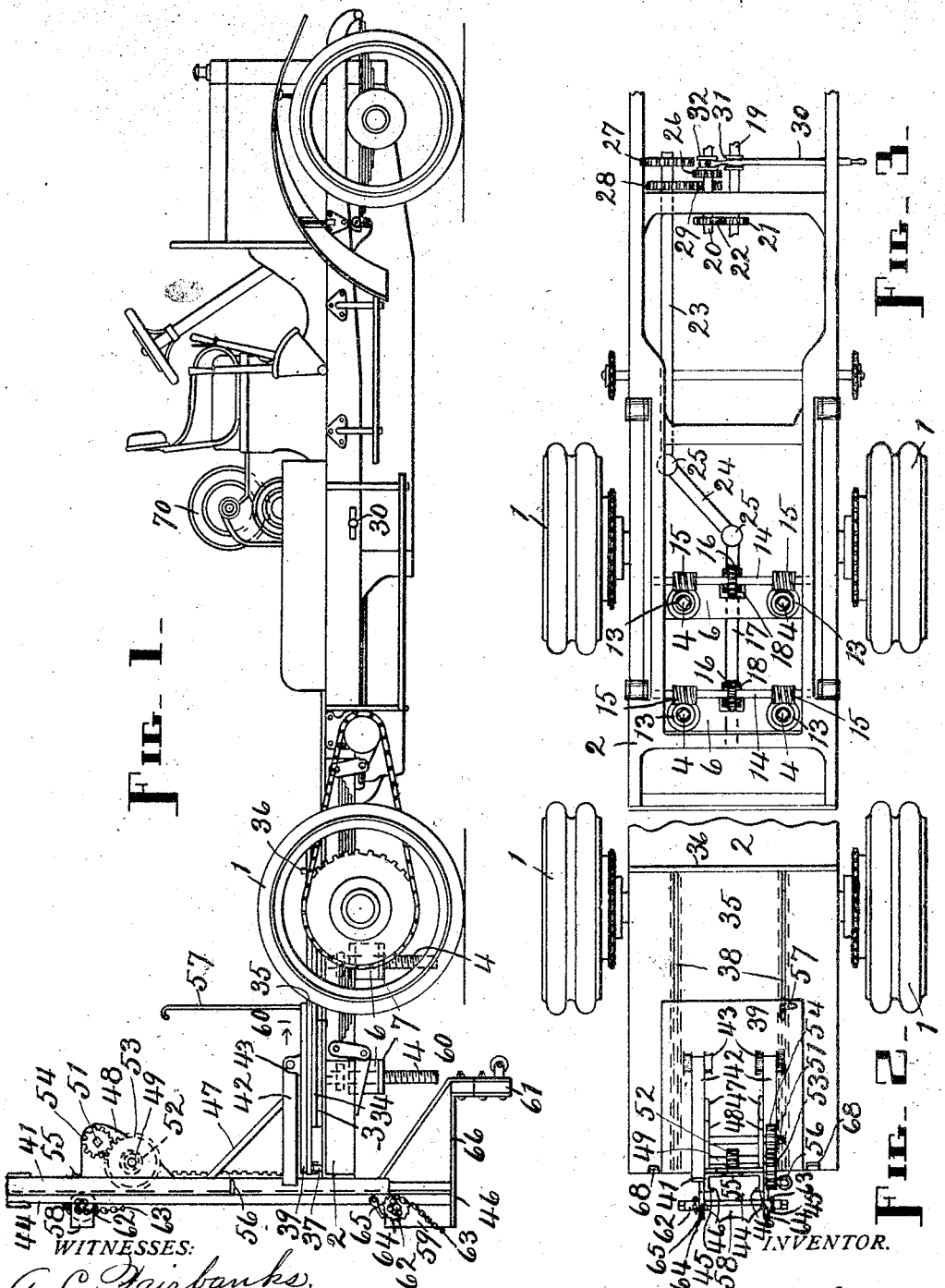

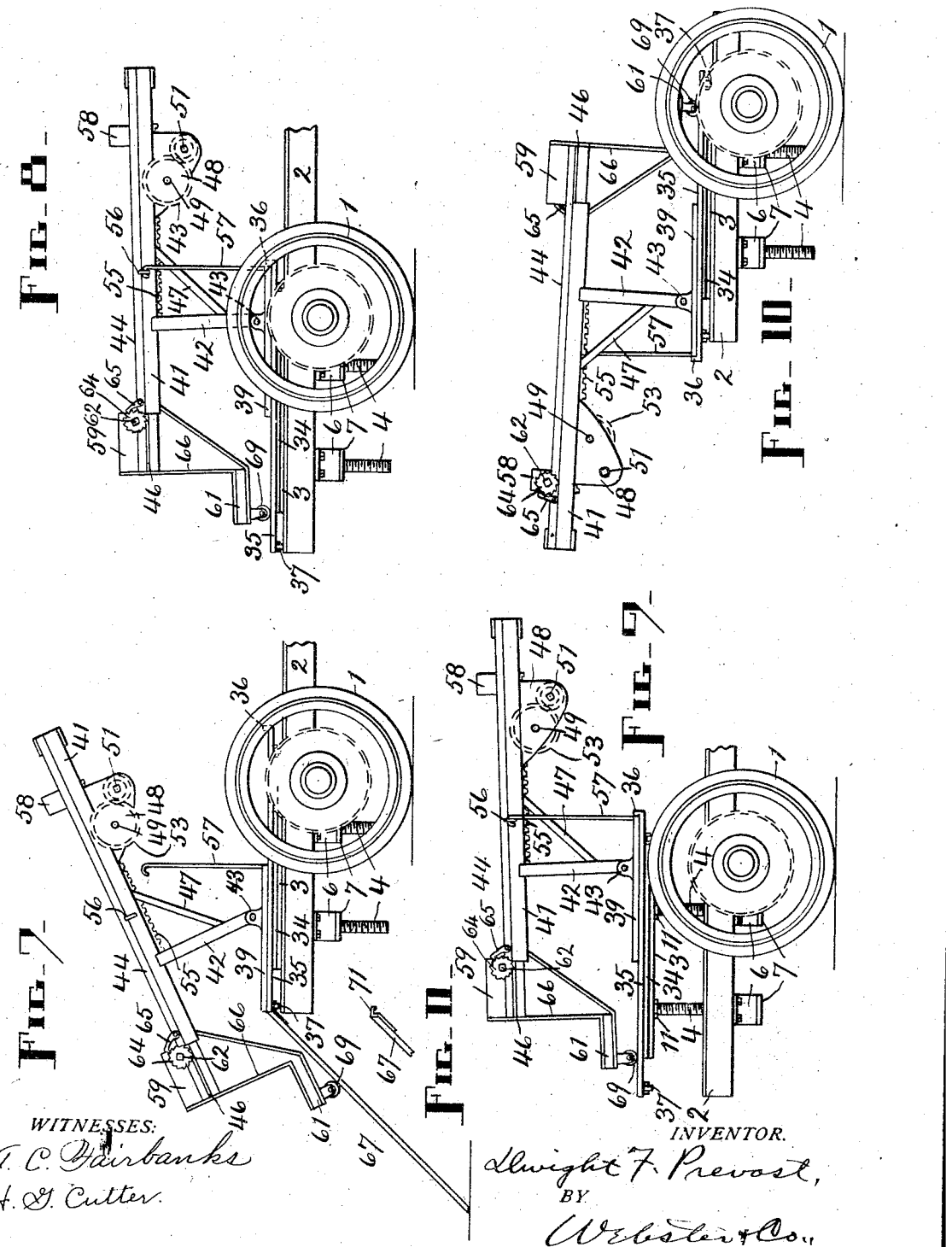

UNITED STATES PATENT OFFICE.

DWIGHT F. PREVOST, OF NEW YORK, N. Y.

TREE-HANDLING APPARATUS.

1,138,972. Specification of Letters Patent. Patented May 11, 1915.

Application filed March 19, 1913, Serial No. 755,344. Renewed October 6, 1914. Serial No. 865,277.

*To all whom it may concern:*

Be it known that I, DWIGHT FRANCIS PREVOST, a citizen of the United States of America, residing at New York, in the county of New York and State of New York, have invented a new and useful Tree-Handling Apparatus, (the same being an improvement of the device for lifting and transporting trees set forth in United States Letters Patent No. 639,286,) of which the following is a specification.

My invention relates to improvements in mechanism or apparatus, carried by a vehicle of the truck type, for lifting, securing for transportation, and lowering tall objects of great weight, and more especially trees of such large dimensions that their removal for transplanting would be difficult if not impossible of accomplishment without apparatus especially designed for that purpose, and said invention resides in certain peculiar elevating, turning, and lowering means applicable to a truck, and especially to a motor-driven truck, all as hereinafter set forth.

The size or bulk, weight and shape of trees renders difficult the task of transplanting them, and for this work powerful apparatus is required that is capable of lifting a tree bodily out of the hole which is first dug around and under the roots at the base of the hole, of mounting such tree on a truck in proper position for transportation and securely retaining it in such position while being transported, to any required distance, and, upon arrival at the place where the tree is to be reset, of lowering the same into the new hole dug to receive it or its root base, and the primary object of my invention is to provide highly efficient means for expeditiously and conveniently doing the aforesaid work with the minimum amount of labor.

The advantage of employing a motor-driven truck for moving trees to a considerable distance is obvious, and the need of a low-down frame and wheels of a fairly large diameter self-evident, consequently the tree-handling mechanism applied to such a truck must be of such a nature as to enable certain of the supporting parts with a tree thereon to be elevated above the horizontal plane of the tops of the rear wheels and to be turned while thus elevated. The apparatus which forms the subject of this application includes means for thus raising and turning the tree, and then lowering the same. These operations must be performed when the tree is loaded, and again when the tree is unloaded. This feature is not found in my Patent, No. 639,286, but is very essential to the successful combination, with a truck of the type herein mentioned, and an example of which is illustrated in connection herewith, of tree-handling appliances, or to the conversion of such a truck into a tree-handling apparatus, complete and practicable in all respects.

A further novel feature of the invention is the means whereby undue length of body of the truck is obviated, and herein is found one of the objects of said invention.

The other structural features of the apparatus are generally found in the aforesaid patent, although in a less highly developed state than and in some cases lacking certain improvements that appear herein and as will be more particularly pointed out hereinafter, and the principal operative features or functions in a broad sense are very much the same in both cases.

From the above it will be understood that, in addition to the objects and advantages hereinbefore plainly designated, there are other objects and advantages, and these will be as plainly designated in the course of the following description.

A preferred form of embodiment of the invention, whereby I attain the objects and secure the advantages of the same, is illustrated in the accompanying drawings, and I will proceed to describe the invention with reference to said drawings, although it is to be understood that the form, construction, arrangement, etc., of the parts in various aspects are not material and may be modified without departure from the spirit of the invention.

In the drawings, in which like numerals designate like parts throughout the several views, Figure 1 is a side elevation of a motor-driven truck, with which is embodied in practical form the tree-handling elements as considered apart from the truck itself, the latter, of course, being also a tree-handling element in that it supports the other elements, furnishes through the medium of its engine power for operating certain of said first-mentioned elements, and serves as a carrying or transporting vehicle for the trees; Fig. 2, a top plan of the rear end portion of the apparatus as a whole; Fig. 3, a top plan of the elevator-operating mechanism, including the transmission therefor, and of so much of the truck body or frame as is needed to support said mechanism, Fig. 4, an enlarged rear end elevation of the apparatus, the parts in this view, as in the first two views and Fig. 6, being initially disposed or in what may be termed normal position; Fig. 5, a cross section on lines 5—5, looking down, in Fig. 4; Fig. 6, an enlarged cross-section taken on lines 60—60, looking in the direction of the associated arrow, in Fig. 1; Fig. 7, an operative view, in side elevation, showing the bole-carrier tilted; Fig. 8, a similar operative view showing said carrier after it is turned into an approximately horizontal position and with its platform drawn forward; Fig. 9, still another operative elevation showing the parts which are supported on the elevator raised by the latter in readiness to be turned half-way around through the medium of the turn-table, without contacting with the rear wheels of the truck; Fig. 10, a side elevation of the same movable parts as before after they are turned and lowered onto the truck frame again, and, Fig. 11, a detail of the upper end portion of the track plate.

Of the truck the rear wheels and the frame are the elements most closely connected or intimately associated with the other elements of the invention, although naturally the truck as a whole is an essential factor. Such wheels appear at 1—1 and such a frame at 2 in the accompanying truck illustrations.

Located in the rear of the vertical axial plane of the wheels 1 is an elevator 3. This elevator is in the form of a round turn-table base and rests on four vertical screws 4 which are supported by two cross-pieces 6 that are rigidly attached to the frame 2 underneath the same. The elevator screws 4 are not mounted directly in the cross-pieces 6, but in sleeves 7 which are mounted directly in said cross-pieces and arranged to rotate therein without reciprocation. The bearings for the sleeves 7 consist in part of removable clamps 8 bolted to the cross-pieces 6, and bearing balls 9 may be used, as shown at the left hand of Fig. 6, where the clamp is removed and the sleeve shown in section. The screws 4 are in threaded engagement with the sleeves 7, and said screws are prevented from rotating by any suitable means such as angular heads 10 on the screws and angular sockets 11 on the bottom of the elevator 3 into which said heads are received, together with pins 12. The latter pass through the sockets 11 and the heads 10 and constitute one means by which the elevator 3 is held on the screws 4 and prevented from being tilted thereon, although other well-known means are available. Each sleeve 7 is provided at the top with an integral worm-wheel 13.

The screws 4 are operated when the sleeves 7 are rotated, being raised or lowered according to the direction of the rotation of said sleeves, and said sleeves are driven through the medium of the worm-wheels 13, by the transmission mechanism described below.

Suitably journaled in the frame 2 in front of each pair of worm-wheels 13, crosswise of said frame, is a horizontal shaft 14 which is provided with a pair of worms 15, the location and arrangement of parts being such that said worms engage said worm-wheels. The shafts 14 are also provided with worm-wheels 16, there being one such wheel in the center of each shaft. Suitably journaled in the cross-pieces 6 is a shaft 17 that extends longitudinally of the frame 2 and is directly below the worm-wheels 16, and this shaft has two worms 18 which are so positioned thereby that they engage said worm-wheels. In Fig. 3 fragments of a main driving shaft and an intermediate shaft are represented at 19 and 20 respectively. Power is transmitted from the main shaft 19 to the intermediate shaft 20 through engaging gears 21 and 22 which respectively are secured on said shafts, and from said intermediate shaft to the shaft 17 through certain other gears, a shaft 23 suitably journaled beneath the frame 2 beyond or at the left of said shaft 20, and an oblique shaft 24 and universal couplings 25—25, one of said couplings connecting the rear end of said shaft 23 with the adjacent end of said oblique shaft and the other of said couplings connecting the front end of said shaft 17 with the adjacent end of said oblique shaft. The gears last referred to comprise a gear 26 mounted on the shaft 20 to revolve therewith, but adapted to slide thereon, two gears 27 and 28 secured on the shaft 23, and an intermediate gear 29 mounted to mesh with said gear 28. The gear 26 bears such relation to the gears 27 and 29 that it can be actuated forward into engagement with the gear 27 and rearward into engagement with the gear 29.

The gear 26 revolves in one direction and receives its motion from the shaft 19 through the medium of the gears 21 and 22 and the shaft 20; and, when said first-mentioned gear is in mesh with the gear 27, the shafts 23, 24 and 17 are driven in the direction to raise the elevator 3, as the worms 18 actuate the worm-wheels 16 and the shafts 14, the worms 15 actuate the worm-wheels 13 and the sleeves 7, and the latter act on the screws 4, and, when in mesh with the gear 29, said shafts and other revoluble parts are driven in the opposite direction, since the gear 28 is rotated by the gear 29 in the opposite direction to that given the gear 27 by the gear 26 in the first instance, and said screws are drawn downward and carry with them said elevator. The gear 26 is represented in neutral position in Fig. 3, as it must be except at such times as it is desired to either raise or lower the elevator. As a simple and convenient device for shifting the gear 26 on the shaft 20 from neutral position into either of its two active positions and back again to neutral position, I have shown a lever or shipper 30 which is pivotally connected with or fulcrumed (at 31) on the shaft 19, is provided at its outer terminal with a handle which is in convenient reach at one side of the frame 2, and has its inner terminal operatively connected with a shipper collar 32 integral with said gear. It will thus be seen that, when the handle of the shipper 30 is moved rearwardly, the gear 26 is actuated into engagement with the gear 27, and that, when said handle is moved forwardly, said gear 26 is actuated into engagement with the gear 29, assuming in each case that said gear 26 is initially in neutral position. The movements required on the part of the shipper 30 to actuate the gear 26 into neutral position and to change direction are clear from the foregoing in connection with the drawing.

Pivotally mounted at 50 on the elevator 3, with balls 33 interposed, is a turn-table 34, and forming a part of said turn-table is a platform 35 which is necessarily too long to be turned around or half-way around in the space between the wheels 1. The platform 35 is provided at one end on top with a transverse stop 36 and at the other end underneath with one or more rollers 37. When the turn-table 34 is normally disposed it stands with the platform 35 extending longitudinally of the frame 2, and with the stop 36 at the front and the rollers 37 at the rear. When the elevator 3 is down, the rollers 37 bear and may ride on the frame 2, such frame having a closed top at the rear end, and so support the rear end of the platform 35. The rollers 37 ride on the frame 2 when it is necessary to swing the platform 35 a little in one direction on the other during the initial loading operation in order to present the bole-carrying parts to the best advantage to the tree, also during the final unloading operation, and at such other times as may be required for the proper adjustment of the load. Extending longitudinally through the platform 35 and opening through the top thereof is a pair of dove-tail grooves 38.

Mounted on the rotatable platform 35 is a sliding platform 39. The platform 39 is provided on the bottom with a pair of dove-tail ribs 40 to fit and slide in the grooves 38. The stop 36 prevents the platform or slide 39 from leaving the platform 35 at the end where said stop is located.

A bole-carrier is provided, which in some respects is similar to the corresponding element in my prior apparatus. Said bole-carrier comprises a frame 41 which has a pair of rigidly attached arms 42 that are pivotally mounted on or attached to (at 43) the sliding platform 39, and a post 44 mounted to slide longitudinally in said frame. The frame 41 here presented consists of corner irons rigidly connected by suitable braces or cross-pieces and having inturned edges 45—45, Figs. 2 and 5, to fit into longitudinal grooves 46 in the sides of the post 44. Thus the post 44 is securely supported and suitably guided. Braces 47 extend between the frame 41 and the arms 42.

A pair of brackets 48 on the frame 41 support two shafts 49 and 51. Upon the shaft 49 is secured a pinion 52 and a gear 53, and upon the shaft 51 is secured a small gear or pinion 54 in mesh with said gear 53. There is a longitudinal rack 55 on the post 44, which projects between the adjacent outer edges of the corner pieces of the frame 41, and the pinion 52 is so located that it meshes with said rack. The shaft 51 is designed to have a crank attached to either end thereof, and when said shaft is rotated its pinion 54 actuates the gear 53 and so causes motion to be transmitted through the shaft 49 and the pinion 52 to the rack 55 and the post 44. It is by this means and in this manner that the post is elevated and depressed, accordingly as the shaft 51 be rotated in one direction or the other. There is an eye 56 in one side of the frame 41, and a hook 57 attached to the sliding platform 39 to engage said eye, when the bole-carrier is tilted from the vertical into an approximately horizontal position, and assist in retaining it in such last-mentioned position.

The post 44 is provided on its outer face with an upper saddle-block 58 and a lower saddle-block 59, (it being assumed for the purpose of this description that said post is in its vertical position), and at its base with a support or "pan" 61 for the root base of the tree; and said post is equipped, at or adjacent to each of said saddle-blocks, with a shaft 62 for a chain 63 used to bind the bole to the block, the ends of such chain being fastened to such shaft, and a ratchet 64 and pawl 65 for such shaft. The functions of these binding and releasing members for the bole will be readily understood.

The pan 61 is supported at the front end and depends from such end of an arm 66 which extends forward from the base of the post 44, when said post is standing vertically, the bottom of such arm being on a level with the bottom of said post. Thus provision is made, not only for supporting the bole of a tree, but also for supporting the root base thereof, both the pan 61 and the arm 66 contacting with such base and affording a support therefor, said pan especially being a direct supporting medium at all times after the loading commences. This is a valuable feature of the invention because of the additional facilities afforded thereby for distributing the load and the direct support which it affords for the root base; moreover, supporting means supplementary to the arms 42 for the entire load are furnished.

A track-plate 67 is provided for the offset at the base of the bole-carrier to ride on at certain stages of the loading and unloading operations, thus relieving the arms 42 and other parts of considerable strain, and furnishing a good support for the members that carry the tree base while said carrier is being drawn bodily upward and forward in loading and moved bodily rearward and downward in unloading. The track-plate 67 is provided at one end with hooks, one of which is clearly shown at 71, in Fig. 11, to fit into slots 68—68, Fig. 2, in the platform 35 at the end opposite the stop 36. The arrangement of parts is such that, when the track-plate is in place, with its hooks in the slots 68, the top of said plate is on a level with the top of the platform 35, as shown in Fig. 7. A roller 69 is mounted on the front of the pan 61 to ride on the track-plate 67 and the platform 35.

A rope-hoisting device or windlass 70 is carried by the truck just behind the seat, the purpose of which will appear presently.

Having now described the construction of my apparatus, I will next proceed to explain the manner of its operation. In the first place the truck is backed up to the hole dug around the roots of the tree to be removed, the bole-carrier is lowered vertically into such hole, with so much of said carrier in contact with the tree base as the nature of the same will permit, and the bole is made fast to the post 44 or to the saddle-blocks 58 and 59, by means of the chains 63, the shafts 62, and the ratchets 64 and pawls 65. Then a crank is applied to the shaft 51, and the pinion 54, gear 53 and pinion 52 are actuated to raise the rack 55 and so lift the post 44 and with it the tree. After the tree is raised vertically in a direct line in this manner and clear of the bottom of the hole, the bole-carrier with said tree is tilted, the top of said carrier coming forward and the pan 61 going rearward, and the track-plate 67 is placed in position under the roller 69. The tilting of the bole-carrier is at all times done on the pivotal points 43.

A rope and tackle are employed to tilt the parts and to bring about the next succeeding operation, presently to be explained, such rope being fastened to the tree near the top and connected with the windlass 70. Since the rope and tackle form no part of my invention, and the application of the same will differ more or less in every case, it is not deemed necessary or feasible to attempt to illustrate them in connection herewith; neither does an illustration of the tree appear to be needed, especially in view of what is shown in the patent of 1899.

Returning to the matter of the operation of the apparatus, it will be assumed that the platform 39 has been drawn forward, the ribs 40 sliding in the grooves 38, by the continued winding up of the aforesaid rope, and that the roller 69 has moved up on the track-plate 67, until the parts stand as shown in Fig. 7. The rope in being wound up acts through the tree and bole-carrier, including the arms 42, to tilt said tree and carrier and at the same time to draw forward the platform 39, and, as said rope continues to be wound up, said carrier is rocked into an approximately horizontal position, and said platform is actuated forward into contact with the stop 36 which limits further movement in that direction, the parts supported by said platform going with it, and the roller 69 riding off of the track-plate 67 onto the platform 35. The tilting or rocking members are now resting entirely and directly on the platforms 39 and 35, which in turn are supported by the turn-table members and the frame 2, and are disposed as represented in Fig. 8. The rollers 37 are still bearing on the rear-end platform part of the frame 2. Next the shipper 30 is actuated to throw the gear 26 into mesh with the gear 27, and so to cause the power-transmission mechanism to operate to raise the elevator 33. The latter is raised, by the means and in the manner hereinbefore fully described, until the bottom of the platform 35 is above the level of the tops of the wheels 1. As soon as this position is reached the power to the elevator is shut off or discontinued. The parts thus disposed appear in Fig. 9. While in this elevated position, which enables the platform 35 to clear the wheels 1, said platform with all above it is turned half-way around on and with the turn-table 34, so as to present the pan 61 and the root base supported thereon to the front and the branches of the tree to the rear, this being the only position in which such an object as a tree can be transported to advantage. Finally the power is applied to lower the elevator 33 and its load onto the frame 2 again—see Fig. 10. When this is done the loading operation is completed and all is in readiness to transport the tree to the new place prepared to receive it. Here the rollers 37 are bearing on the frame 2 in front of the elevator 33, instead of behind the latter as in the first instance. Upon arriving at the new hole dug for the tree, movements just the reverse to those described above are required, that is to say, the elevator is raised, the platform 35 is turned to present the pan 61 to the rear, said elevator is lowered, said platform is moved rearwardly and the roller 69 caused to move from said platform onto and to descend the track-plate, which has been placed to receive said roller, said plate is taken away when the bole-carrier approaches the vertical position, said carrier is permitted to assume such position and the post 44 is then lowered until the tree rests on the bottom of said hole, and the chains 63 are cast off. This last is not done, of course, until the tree is able to stand without support from the apparatus.

When the bole-carrier is in the vertical position, the lower part of the frame 41 bears against the rear end of the frame 1 and the arms 42 are in a horizontal position, thus such arms and said frame are responsible for the assumption and maintenance of such position by said carrier.

In loading, as in unloading, the track-plate 67 is used only while the bole-carrier is tilted well out of the perpendicular, and while the roller 69 is passing over the adjacent end of the platform 35.

As soon as the roller 69 is on the platform 35, the hook 57 is engaged with the eye 56, and said hook is not disengaged from said eye again until, in unloading, the platform 39 is about to be moved toward the rear. Thus the bole-carrier during practically the entire time that it occupies the approximately horizontal position is locked in such position, as will be seen upon again referring to Figs. 8, 9 and 10.

What I claim as my invention, and desire to secure by Letters Patent, is—

1. An apparatus, of the class described, comprising a bole-carrier, means to tilt such carrier into an approximately horizontal position, means to elevate and depress said carrier, and means to turn said carrier end for end while raised by said elevating and depressing means.

2. An apparatus, of the class described, comprising lifting and lowering means for a tree, tilting means for such first-mentioned means, and elevating and depressing means and turning means for such tilting means.

3. An apparatus, of the class described, comprising lifting and lowering means for a tree, tilting means for such first-mentioned means, and reciprocable means and turning means for said tilting means.

4. An apparatus, of the class described, comprising lifting and lowering means for a tree, tilting means for such first-mentioned means, and reciprocable means, elevating and depressing means, and turning means for such tilting means.

5. In apparatus of the class described, a vehicle frame, an elevator supported thereby, a rotatable member on said elevator, and a bole-carrier supported by said rotatable member.

6. In apparatus, of the class described, a vehicle frame, an elevator supported thereby, a rotatable member on said elevator, a sliding member supported by said rotatable member, and a bole-carrier connected with said sliding member.

7. In apparatus of the class described, a vehicle frame, an elevator supported thereby, a turn-table on said elevator, a platform on said turn-table, said platform being provided with a member to ride on said frame, a sliding platform mounted on said first-mentioned platform, and a bole-carrier connected with said sliding platform.

8. In apparatus of the class described, a vehicle frame, an elevator supported thereby, a rotatable platform on said elevator, a sliding platform mounted on said first-mentioned platform, the latter being provided at one end with a stop for said sliding platform, and a bole-carrier connected with said sliding platform.

9. In apparatus of the class described, a vehicle frame, an elevator supported thereby, a turn-table on said elevator, a platform on said turn-table, said platform being provided with a member to ride on said frame and with a stop, a sliding platform mounted on said first-mentioned platform, said stop being in the path of said sliding platform, and a bole-carrier connected with said last-mentioned platform.

10. The combination, in apparatus of the class described, with a vehicle frame, a sliding member thereon, and a bole-carrier connected with said member, of detachable supporting means for the lower rear part of said carrier when the latter is moved with said platform.

11. The combination, in apparatus of the class described, with a vehicle frame, a sliding member thereon, and a bole-carrier connected with said member, said carrier having at one end an offset root-base supporting part, of detachable supporting means for said part when said carrier is moved with said sliding member.

12. The combination, in apparatus of the class described, with a vehicle frame, a sliding member thereon, a bole-carrier connected with said member, said carrier having at one end an offset root-base support, and a roller carried by such support, of detachable supporting means for said root-base support and track means for said roller when said carrier is moved with said sliding member.

13. The combination, in apparatus of the class described, with a vehicle frame, a sliding member, a supporting member for such sliding member, a bole-carrier connected with said sliding member, said carrier having at one end an offset root-base support, of a track-plate, for said root-base support, at one end attachable to and detachable from said supporting member for said sliding member.

14. In apparatus of the class described, a bole-carrier comprising a hollow frame having inturned flanges, a post having side grooves to receive said flanges, and actuating means for said post.

15. In apparatus of the class described, a bole-carrier comprising a hollow frame having inturned flanges, a post having side grooves to receive said flanges, and provided at the bottom end with supporting means which extend under the bottom end of said frame, and actuating means for said post.

16. The combination, in apparatus of the class described, with a vehicle frame, and a power transmission shaft, of an elevator supported by said frame, mechanism for raising and lowering said elevator, means to connect said mechanism with and disconnect it from said shaft, and tree-handling members mounted on and connected with said elevator.

17. The combination, in apparatus of the class described, with a vehicle frame, and a power transmission shaft, of rotatable threaded sleeves journaled in said frame, screws in threaded engagement with said sleeves, worms mounted in said frame in engagement with said screws, an elevator platform mounted on said screws, operating mechanism for said worms, means to connect said mechanism with and disconnect it from said shaft, and tree-handling members mounted on and connected with said elevator platform.

18. The combination, in apparatus of the class described, with a vehicle frame, and a power transmission shaft, of an elevator supported by said frame, mechanism for raising and lowering said elevator, means to connect said mechanism with and disconnect it from said shaft, a turn-table on said elevator, and tree-handling members mounted on and connected with said turn-table.

19. The combination, in apparatus of the class described, with a vehicle frame, a reciprocable member, and a bole-carrier pivotally connected with said reciprocable member, of means to lock said carrier, when in an approximately horizontal position, to said reciprocable member.

20. The combination, in apparatus of the class described, with a vehicle frame, an elevator supported by said frame, and a tilting bole-carrier supported by said elevator, of means to lock said carrier, when in an approximately horizontal position, in such position.

21. The combination, in apparatus of the class described, with a vehicle frame, a rotatable member, and a tilting bole-carrier supported by said member, of means to lock said carrier, when in an approximately horizontal position, in such position.

22. The combination, in apparatus of the class described, with a vehicle frame, an elevator supported by said frame, a reciprocable member supported by said elevator, and a bole-carrier pivotally supported by said reciprocable member, of means to lock said carrier to said reciprocable member, when the former is in an approximately horizontal position.

23. The combination, in apparatus of the class described, with a vehicle frame, a reciprocable member, a rotatable support for such member, and a bole-carrier pivotally supported by said reciprocable member, of means to lock said carrier to said reciprocable member, when the former is in an approximately horizontal position.

24. The combination, in apparatus of the class described, with a vehicle frame, an elevator supported by said frame, a rotatable member mounted on said elevator, a reciprocable member mounted on said rotatable member, and a bole-carrier pivotally supported by said reciprocable member, of means to lock said carrier to said reciprocable member, when the former is in an approximately horizontal position.

25. In apparatus of the class described, a vehicle frame, supporting means thereon, and a bole-carrier provided with angularly-arranged intermediate means of pivotal connection with said supporting means, and further provided with offset end means of support adapted to bear on the aforesaid supporting means.

26. In apparatus of the class described, a vehicle frame, a sliding member, a member supported by said frame and adapted to support said sliding member, and a bole-carrier provided with angularly-arranged intermediate means of pivotal connection with said sliding member, and further provided with offset end means for support on said supporting member.

DWIGHT F. PREVOST.

Witnesses:
DAVID GORMAN,
R. H TUBBS.